United States Patent [19]

Yama

[11] 4,168,100
[45] Sep. 18, 1979

[54] ANTI SKID CONTROL UNIT

[75] Inventor: Toshio Yama, Fujisawa, Japan

[73] Assignee: Nissan Motor Company, Limited, Yokohama, Japan

[21] Appl. No.: 824,330

[22] Filed: Aug. 12, 1977

[30] Foreign Application Priority Data

Aug. 13, 1976 [JP] Japan .................................. 51/96749

[51] Int. Cl.² .............................................. B60T 8/02
[52] U.S. Cl. ................................ 303/115; 188/181 A
[58] Field of Search ............... 303/113, 115, 116, 119; 188/181 A

[56] References Cited

U.S. PATENT DOCUMENTS 3,936,095 2/1976 Every ............................. 303/115 X
3,981,543 9/1976 Atkins .............................. 303/115 X Primary Examiner—Duane A. Reger

[57] ABSTRACT

A check valve is integrally formed on one end of an expansion valve slidably disposed in a first stepped bore and arranged to cut communication between the master cylinder and the brake units upon the pressure of the hydraulic fluid biasing the expansion valve to a first normal position being reduced, due to either a signal from a computing circuit indicating a dangerously high rate of deceleration or cessation of the supply of pressurized hydraulic fluid. The movement of the expansion valve from its normal position permits the fluid in the brake units to pressure reducingly expand.

A by-pass valve slidably disposed in a second stepped bore responds to increased master cylinder pressure to increase the pressure biasing the expansion valve to the first normal position to balance the reverse effect of the increased master cylinder pressure. A differential valve integrally connected to the by-pass valve maintains a fail safe pressure transmission path closed until cessation of the supply of pressurized fluid whereupon the master cylinder is directly connected with the brake units.

6 Claims, 5 Drawing Figures

ANTI SKID CONTROL UNIT

BACKGROUND OF THE INVENTION

1. Field of the Invention

This invention relates to a hydraulic braking system for a motor vehicle and more particularly to an anti-skid unit incorporatable therein.

2. Description of the Prior Art

As is well known it is desirable in view of the ever increasing performance capabilities of the modern motor vehicle to provide therein an anti skid device or unit which will prevent excessive pressure being fed to the cylinders of the brake units during sudden deceleration and thus prevent dangerous wheel lock up and resulting skidding of the vehicle. This particularly so in today's motor vehicles wherein efforts are being constantly made to reduce the overall weight and complexity of the vehicle components and thus the vehicle so as to reduce the comsumption of dwindling petroleum supplies.

One particular anti-skid unit is activatable by a computing circuit which temporarily cuts or severely limits the communication between the master cylinder of the braking system and the brake unit and simultaneously expands the pressurized hydraulic pressure entrapped in the brake unit cylinders to reduce the braking effect generated thereby. This operation is repeatable to maintain the rate of deceleration below a predetermined safe level. However this unit has suffered from overcomplexity and excessive weight in that it uses three spool type valves or valve units slidably disposed in three separatedly formed stepped bores. The resulting conduiting required to interconnect the three bores presents many locations requiring sealing and is difficult to machine and assemble during manufacture of same. Furthermore a rather large heavy bulky housing is required to house the three valve units thus incurring the afore mentioned weight penalty.

SUMMARY OF THE INVENTION

Thus a control unit of the afore described type has been developed in which the weight, size and complexity has been reduced by using only two valve units slidably disposed in two stepped bores. However, despite its simplicity the control unit according to the present invention performs identically with the more complex heavy unit of the prior art.

In detail a check valve is integrally formed on one end of an expansion valve slidably disposed in a first stepped bore and arranged to cut communication between the master cylinder and the brake units upon the pressure of the hydraulic fluid biasing the expansion valve to a first normal position being reduced due to either a signal from a computing circuit indicating a dangerously high rate of deceleration or cessation of the supply of pressurised hydraulic fluid. The movement of the expansion valve from its normal position permits the fluid in the brake units to pressure reducingly expand.

A by pass valve slidably disposed in a second stepped bore responds to increased master cylinder pressure to increase the pressure biasing the expansion valve to the first normal position to balance the reverse effect of the increased master cylinder pressure. A differential valve integrally connected to the by pass valve maintains a fail safe pressure transmission path closed until cessation of the supply of pressurized fluid whereupon the master cylinder is directly connected with the brake units.

Thus it is an object of the present invention to provide an anti skid control unit which is light and compact.

It is another object of the present invention to provide an anti skid control unit which is simple in construction and therefore easy to manufacture and assemble.

Another object of the present invention is to provide an anti skid control unit which is formed with only two stepped bores within the housing of same thereby reducing the amount of conduiting interconnecting said bores to a minimum.

Yet another object of the present invention is to provide an anti skid control unit which requires the minimum amount of sealing members and therefore reduces the risk of hydraulic fluid leakage to a minimum.

BRIEF DESCRIPTION OF THE DRAWINGS

Other features objects and advantages will become more clearly understood as the description of the preferred embodiments proceeds taken in conjunction with the accompanying drawings in which

In FIG. 1 a prior art anti skid control unit is shown in which three stepped bores 1, 2 and 3 are formed. Slidably disposed in the first bore 1 is a first valve unit consisting of a by-pass valve 13 and a differential valve 8, slidably disposed in the second bore is second valve unit comprising an expansion valve 19 and a check valve 9, and slidably disposed in the third bore is a third valve unit consisting of a regulator valve 11. As shown a pump C communicates with the control unit S through a port Pc so as supply pressurised hydraulic fluid to the chamber via the conduit 44. As seen this chamber communicates with two other conduits namely 43 and 27. The first 43 communicates with the reservoir R via a suitable device such as a power steering unit PS. It will be appreciated that this device can be omitted if desired since the main function of the conduit 43 is to act as a drain for the ever increasing volume of fluid fed into the control unit from the pump. However in the case the power steering device or unit is omitted a suitable restriction should replace same so as to maintain a suitable pressure within the afore mentioned chamber 4. A conduit 25 is arranged to branch off from the conduit 27 and to communicate with a chamber 22 via a solenoid valve which comprises a solenoid coil 18, a conically shaped coil spring 17, an armature 15 and a ball shaped sealing member 16. On the other hand the conduit 27 communicates the chamber 4 with a chamber 28. As seen the pressurised fluid in the chamber 22 acts on the end of the expansion valve to bias it in a leftward direction (as seen in the drawings). The pressurised fluid in the chamber 28 acts to urge the by-pass valve 13 in a similar direction.

Figure 1:
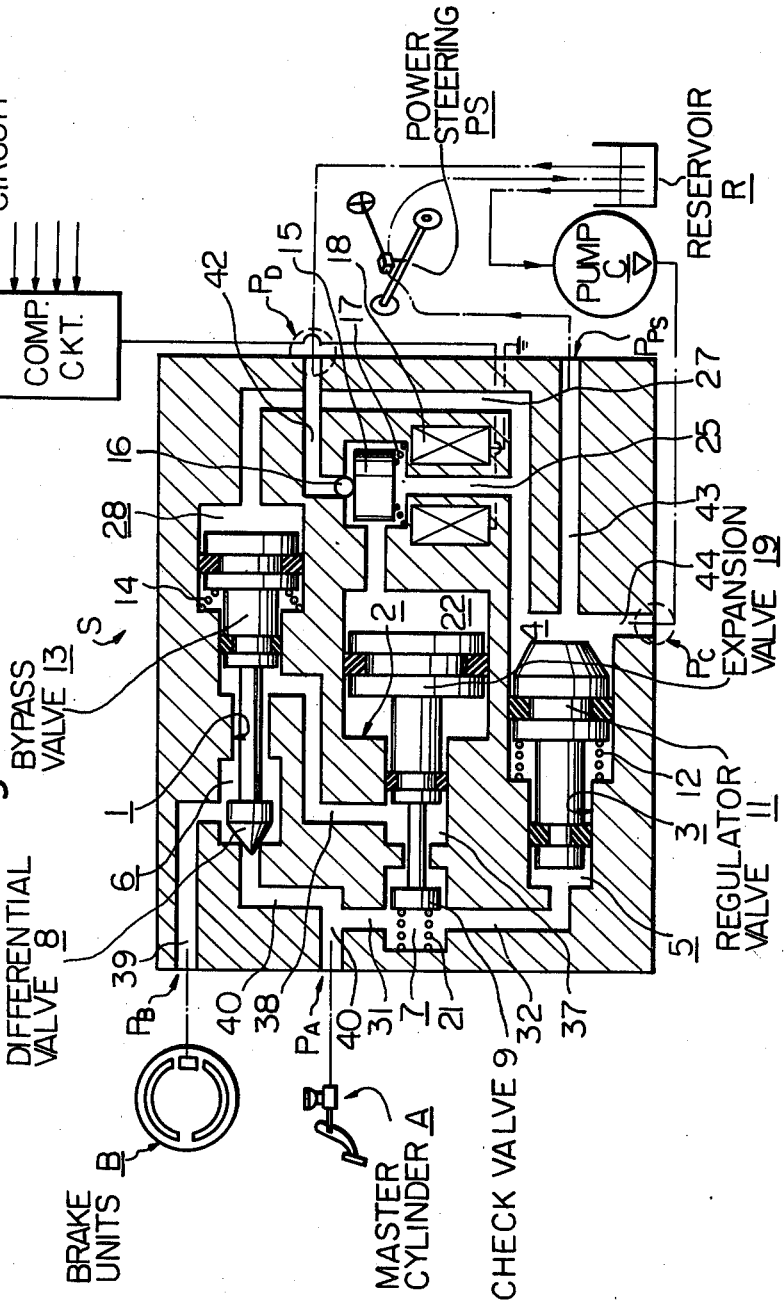
FIG. 1 is a cross sectional view of a prior art anti skid contol unit.

The master cylinder A is arranged to communicate with a chamber 7 via a port $P_A$ and conduits 40 and 31. The chamber 7, as shown, freely communiates with a chamber 5 via a conduit 32. Thus chambers 7 and 5 are constantly exposed to the pressure transmitted thereinto from the master cylinder A. A chamber 6 is arranged to be communicable with the master cylinder via a differential valve member 8. The chamber 6 is arranged to freely communicate with a chamber 37 via a conduit 38 and with the chamber 7 via a check valve 9 which is integrally formed on the end of the expansion valve 19.

Now with this arrangement when all components are functioning normally and no braking of the vehicle is being initiated be depressing the brake pedal, then all three valve units will be urged leftwardly as seen in the drawings to assume the positions illustrated in FIG. 1. As seen the by-pass valve is arranged to be biased to its extreme left position so that the differential valve denoted by the numeral 8 abuts and seals the orifice which permits communication between the chamber 6 and the conduit 40. The expansion valve 19 is arranged to assume a position between the limits of its possible travel wherein the force exerted on the expansion valve by the pressurised fluid in the chamber 22 (supplied thereinto by the pump during normal operation) and the biasing force of the spring 21 abutting the end of the check valve 9 reaches a state of equilibrium. A similar situation arises with respect to the regulator valve 11 as seen it is in position where the force exerted by the pressurised hydraulic fluid in chamber 4 and biasing effect of the spring 12 are equal.

Now when the brake is depressed to increase the pressure prevailing in the chambers 5, 7, 37 and 6, it being understood that the pressure is fed directly to the chambers 5 and 7 and from chamber 7 to chambers 37 and 6 via the check valve 9 and conduit 38 respectively, then the expansion valve and the regulator valve will be biased somewhat to the right as seen in the drawings. Simultaneously the vehicle is decelerated by the pressure trasmitted from the master cylinder to the brake units. B. It will be understood that as the regulator valve is moved into the chamber 4 by the increases in pressure in chamber 5 the degree of communication between chamber 4 and conduit 43 will decrease, the end of the regulator valve more closely approaching the orifice via which conduit 43 communicates with the chamber 4. This reduction of communication between the conduit 43 and the chamber 4 results in an increase in pressure in the chambers 22 and 28. Since the by-pass valve 13 has already assumed it extrme left position then it will be uneffected by this increase. However the expansion valve 19 will be urged back toward the position it has assumed previously to maintain virtually constant connection between the chambers 7 and 37.

Now if the rate of deceleration of the vehicle increases above a level considered by a computing circuit CC as being unsafe then the circuit will issue a signal to the solenoid coil 11 to energise same. This will attract the armature 15 from its home position to permit communication between the chamber 22 and the drain port $P_D$ and cut communication between said chamber 22 and the pump C. The pressure in the chamber 22 is thus permitted to fall to zero and permit the expansion valve (only) to assume it rightmost position as seen in the drawings. This movement of course closes the check valve 9 integrally formed on the end thereof thus isolating the master cylinder A and the brake units B and simultaneously increases the volume of the chamber 37 to permit the pressurised hydraulic fluid entrapped within the braking circuit between the check valve 9 and the brake units B to expand thereinto. This decreases the pressure prevailing in the cylinders of the brake units to reduce the braking effect generated by same. Temporary relaxation of the pressure and braking thus take place to reduce the rate of deceleration of the vehicle. If necessary several such relaxations quickly following one and other may be necessary before the actual rate of deceleration is sufficiently decreased.

Now for any reason should the supply of pressurised fluid from the pump cease then the control unit is fail safe in that a second pressure transmission path namely conduit 31 chamber 6 and conduit 39 opens to directly connect the master cylinder A and the brake units B. This is contrasted with the first pressure transmission path which is conduit 40, conduit 31, chamber 7, chamber 37, conduit 38, chamber 6 and conduit 39. The latter mentioned path will of course be open only during the period that the pump functions to supply pressurised hydraulic fluid into the control unit, and is cut via the afore described movement of the valve members to their rightmost positions. During the period that pressurised fluid is not supplied to the control unit then no anti skid action is possible even if the computing circuit issues a signal to energise the solenoid coil 18.

Figure 2:
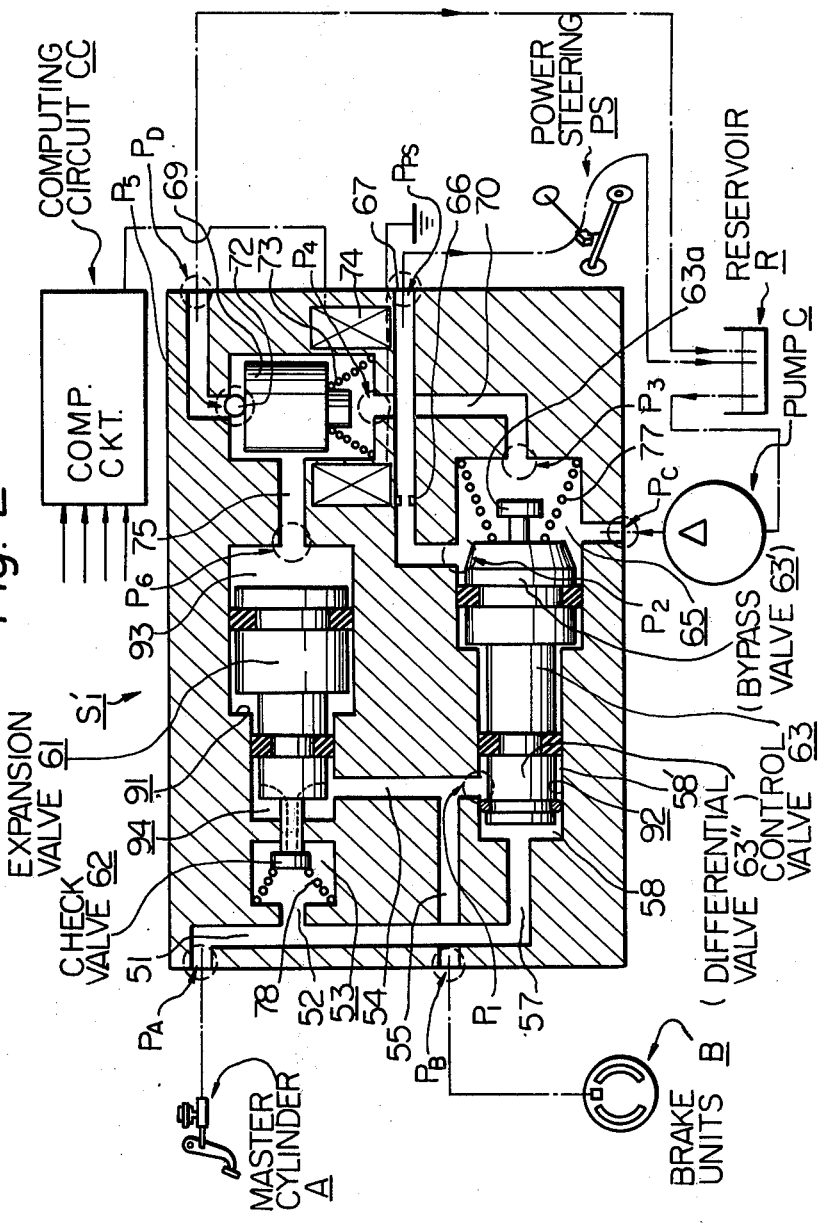
FIG. 2 is a cross sectional view of a first preferred to embodiment of a control unit for an anti skid system according to the present invention.
Figure 2A:
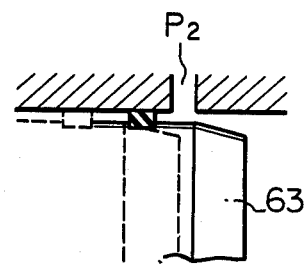
FIG. 2(a) is an enlarged view of a portion of the control valve of the control unit shown in FIG. 2.

In FIG. 2 a first preferred embodiment of the present invention is shown wherein $S_1'$ indicates a control unit which has two stepped bores 91 and 92 formed therein. Slidably disposed in the first bore 91 is a first valve unit consisting of an expansion valve denoted by the numeral 61. Slidably disposed in the second bore 92 is a second valve unit consisting of a control valve 63. As seen the control valve 63 consists of a by-pass valve portion 63' and a differential portion 63", however for simplicity of explanation of the first embodiment reference will be made to only "a control valve" 63. A check valve 62 is integrally formed on one end of the expansion valve 61 as shown. The pump C is fluidly communicated with a chamber 65 through a port Pc. As shown two conduits 70 and 67 open in the chamber 65. The first conduit 70 is arranged to communicate with a chamber 93 via a conduit 75 and a solenoid valve consisting of a solenoid coil 74, a conically shaped coil spring 73, an armature 69 and a sealing member 72 which is either formed integrally with or attached to the top thereof (as seen in the drawings). As shown the armature is normally biased to a position where it closes a port P5 which interconnects the chamber 93 with the drain port $P_D$. The second conduit 67 is arranged to communicate the pump C with a power steering unit PS or the like via the chamber 65 and a restriction 66 formed in the conduit 67. A spring 77 is disposed in the chamber 65 and arranged to bias the the control valve 63 to the left as seen in the drawings. The end of the control valve 63 which is abutted by the spring 77 is formed with a chamber (no numeral) which if we refer briefly to FIG. 2(a) is as shown arranged to reduce the degree of communication between the chamber 65 and the conduit 67 by reducing the degree of opening port P2. The position of the control valve 63 shown in broken lines indicates a fully open position while the position shown in solid lines indicates the situation wherein the communication between the conduit 67 and the chamber 65 is restricted by the movement of the control valve 63 into the chamber 65. Furthermore if the control valve moves into the chamber sufficiently a valve member 63a formed thereon abuts and closes the port P3 which communicates the conduit 70 and the chamber 65.

The master cylinder A is as shown arranged to communicate with two chambers 53 and 58 via conduits 51, 52 and 57. The second conduit 52 is branched off from the conduit 51 to communicate with the chamber 53. The chamber 53 in turn communicates with a chamber 94 via the check valve 62. It will be noted at this stage that the check valve 62 is a single stage type. Let us then turn briefly to FIGS. 2(b) and 2(c) wherein enlarged views thereof expedite easy explanation. The check valve is shown in a closed position in FIG. 2(b) and in an open position on FIG. 2(c). As shown there are recesses indicated by 62a which permit the transmission of pressure from the chamber 53 to the chamber 94 despite the close fit of the valve shaft within the orifice through which the check valve is slidably disposed. As will be appreciated upon the spool formed on the end of the check valve exposed to the chamber 53 abutting the partition member in which the just mentioned orifice is formed then all communication between the two chambers will cease so compared with the situation when it is fully or partially open. Referring back now to FIG. 2 it will be noted that the chamber 94 is communicated via a conduit 54 with chamber 58', with port $P_1$ and a conduit 55 the latter being, as shown, arranged communicate with the cylinders of the brake unit B.

The afore described construction will become clearer as the description of the operation proceeds. Let us consider the situation wherein all components of the anti skid and braking systems are working properly and no braking of the vehicle is initiated by the driver. Thus at this time pressurised fluid will be fed into the chamber 65 via port $P_B$ and thus permitted to flow through the conduit 67 to the power steering unit or the like. The power steering can be omitted if desired since the function of the conduit is simply to act as a drain for the continuously increasing volume of fluid pumped into the chamber 65. Since there is no braking and no resulting deceleration signal is fed from the computing circuit CC to energise the solenoid coil 74 the pressure of the fluid prevailing in the chamber 93 will be substantially equal to that prevailing in the chamber 65. Now as in the case of the prior art a differential piston effect is induced by the provision of larger effective areas exposed to the pressure generated by the pump C than the effective areas exposed to the pressure generated by the master cylinder A. Hence both valve units will be biased leftwardly, the expansion valve being biased to a position where an equilibrium is established between the biasing force generated by the pressure prevailing in the chamber 93 and biasing force of a spring 78 arranged to bias the check valve 62 in a rightward direction and the control valve being biased completely to its extreme left position by the combined biasing forces of the pressurised fluid acting on the end thereof and the biasing force of the spring 77. Under the just mentioned conditions a first path for the transmission of the pressure from the master cylinder A to the brake units B is established, namely port $P_A$, conduit 51, conduit 52, chamber 53, chamber 94, conduit 54 and conduit 55. This of course is the only path possible since the control valve 63 has assumed a position which cuts communication between chambers 58 and 58' and thus port $P_i$ and conduit 57.

Figure 2B:
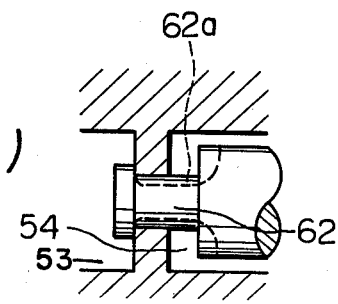
FIGS. 2(b) and 2(c) are enlarged views showing details of the check valve which is integrally connected to the expansion valve shown in the first preferred embodiment in FIG. 2.
Figure 2C:
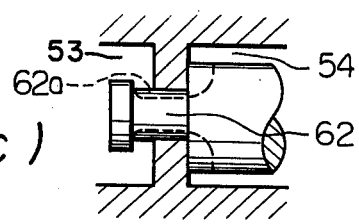

Now if braking which induces a rate of deceleration below the level at which the computing circuit produces a pressure relaxing signal then the first pressure transmission path will be only slightly modified by the increased pressure acting on the ends of the expansion valve 61 and the control valve 63 whereby both valves will be moved slightly in the direction of the chamber 93 and chamber 65 respectively. Under these conditions the communication between conduit 67 and the chamber 65 will be reduced by the restricting of the flow possible through the port $P_2$. This induces a slight increase in the pressure prevailing in the chamber 93 whereby a slight feed back phenomenon takes place and the expansion valve 61 is slightly urged back toward the chamber 53 thus reducing the volume of the chamber 94 slightly. This of course maintains substantially the same communication between the chambers 53 and 94 by returning the check valve 62 to almost the position it assumed during no braking operation. However should the rate of deceleration exceed the predetermined level and the computing circuit accordingly issue a signal indicative of same then the solenoid coil 74 will be energised to attract the armature 94 from its home position where it closes port P5 to a position where it opens said port and closes port P4. The pressure prevailing in the chamber 93 is thus permitted to drop to zero and the accordingly the expansion valve 61 moves rightwardly into the chamber 93. The check valve is accordingly moved to a position as shown in FIG. 2(b) to cut communication between chambers 53 and 94. Simultaneously the volume of the chamber 94 increases due to the afore mentioned movement of the expansion valve, thus pressure is no longer permitted to be transmitted to the brake units and the pressure prevailing therein is permitted drop due to the increased volume available to the fluid temporarily retained between and in the cylinders of the brake units, the conduits 55 and 54 and the chamber 94.

With the above mentioned pressure relaxation the tendency of the wheels of the vehicle to lock up is prevented and as in the case of the prior art several repetitions of pressure relaxation and normal communication quickly following one and other may be necessary to reduce the speed of the vehicle while retaining the rate of deceleration as high as safely possible.

In the event of pump failure or malfunction (whereupon insufficient pressure is fed therefrom) stalling or stopping of the engine which drives the pump, conduit failure and or loss of the mechanical connection between the engine which drives the pump the anti skid system is fail safe in that the arrangement and construction of control unit according to the first preferred embodiment of the present invention immediately connects the master cylinder with the brake units through a second pressure transmission path. Under the above mentioned conditions of loss of hydraulic pressure then the pressure in the chambers 65 and 93 will immediately fall to levels where the expansion valve and the control valve will move rightwardly (as seen in the drawings) whereupon the check valve will assume the position as shown in FIG. 2b and cut communication between chambers 53 and 94. The control valve 63 will be biased by the pressure fed into chamber 58 to a position where the port $P_1$ will be opened to permit fluid communication between the master cylinder and the brake units via a second pressure transmission path consisting of conduit 51, conduit 57, chamber 58 and conduit 55. Thus as in the prior art the direct communication between the master cylinder and the brake units is immediately established upon any one of the afore mentioned malfunctions.

What is claimed is:

1. An anti skid unit for a motor vehicle hydraulic braking system said anti skid unit being equipped with a source of hydraulic fluid under pressure, comprising:

first and second fluid ports, first valve means which is responsive to the pressure supplied into said anti skid unit from said source of hydraulic fluid under pressure said valve means permitting fluid communication between said first and second ports via a first pressure transmission path when it assumes a first position under the biasing influence of the pressure of said hydraulic fluid under pressure fed into said anti skid device and cutting said fluid communication when it assumes a second position in the absence of said pressure of said hydraulic fluid under pressure and providing an anti skid inducing pressure reduction at said second port by moving from said first normal position to said second position;

electromagnetic valve means which isolates said source of hydraulic fluid under pressure and said first valve means and causes said absence of said pressure of said hydraulic fluid under pressure upon receiving an energizing signal;

second valve means which is responsive to said pressure of said hydraulic fluid under pressure which is fed into said anti skid device keeps a second pressure transmission path between said first and second ports in a closed position in response to biasing pressure of said fluid under pressure and opens said second pressure transmission path in the absence of said pressure of said hydraulic fluid under pressure and further arranged to be sensitive to small variations in the pressure introduced into the anti skid device through said first port and to be movable through a predetermined distance without opening said second pressure transmission path and by said movement within said predetermined distance modulate the pressure under the influence of which said first valve means is baised to said first position so that the fluid connection between said first and second ports is maintained constant irrespective of said small variations in pressure while said hydraulic fluid under pressure is fed into said anti skid device.

2. An anti skid unit as claimed in claim 1, where said first valve means comprises:

a first valve unit slidably disposed in a first stepped bore, said first valve unit being arranged to define within said first stepped bore first, second and third fluid chambers, said first chamber communicating with said first port and also with said second chamber when said first valve unit assumes said first normal position and isolating therefrom when said first valve unit assumes said second position, said second chamber freely communicating with said second port;

said second valve means comprises:

a second valve unit slidably disposed in a second stepped bore said second valve defining in combination within said second stepped bore fourth, fifth and sixth fluid chambers, said fourth chamber directly communicable with a third port and communicable with a fourth port and said third chamber, said fifth chamber being communicating with said second chamber and said second port when said second valve unit assumes a first normal position and isolating therefrom when said second valve unit assumes a second position, said sixth chamber in direct fluid communication with said first port, first chamber and further arranged to be in communication with said second chamber when said second valve unit assumes said second position and be isolated therefrom when said second valve unit assumes said first normal; and said electromagnetic valve means is interposed between third and fourth chambers cuts normal communication therebetween and communicates said third chamber with a fifth port during the period an energizing signal is fed to said electromagnetic valve means.

3. An anti skid unit as claimed in claim 2 wherein said first port communicates with a master cylinder of said hydraulic braking system for the introduction of the master cylinder pressure from said master cylinder into said first and sixth chamber;

said second port communicates with the hydraulic fluid cylinders of the brake units;

said third port communicates with a source of hydraulic fluid under pressure;

said fourth port communicates with reservoir means with communication between said fourth port and said reservoir means restricting the flow of hydraulic fluid therebetween; and said fifth port communicates directly with said reservoir means.

4. An anti skid unit as claimed in claim 3 wherein:

said source of fluid under pressure is a pump which is fluidly connected to said reservoir means; and a power steering unit fluidly interposed between said fourth port and reservoir means, said power steering unit restricting said flow of hydraulic fluid from said fourth chamber and which uses the hydraulic fluid discharged from said fourth port as a source of motive energy.

5. An anti skid unit as claimed in claim 2 wherein said first valve unit is formed with a single action check valve on the end thereof, said check valve controlling said communication between said first and second chambers and comprising:

a shaft reciprocatably passed through an orifice formed in a partition formed between said first and second chambers;

spool means formed on the end of said shaft, said spool means abutable with said partition upon said first valve unit assuming said second position to cut fluid communication between said first and second chambers;

said shaft being arranged to permit fluid communication thereover when said first valve unit assumes said first normal position; and first biasing means disposed between said spool means and the end wall of said first chamber biasing said check valve and thus said first valve unit in a direction which urges said spool means into abutment with said partition.

6. An anti skid unit as claimed in claim 2 wherein the diameter of the end of said first valve unit exposed to said third chamber is larger than the diameter of the end of same exposed to said second chamber; and the diameter of the end of the second valve unit exposed to said fourth chamber is larger than the diameter of the end of same which is exposed to said fifth chamber;

thereby allowing the pressurized hydraulic fluid normally supplied into said fourth chamber and said third chamber to urge said first and second valve units to their respective first normal positions.

* * * * *